US009015670B2

(12) United States Patent
Chavvakula et al.

(10) Patent No.: US 9,015,670 B2
(45) Date of Patent: *Apr. 21, 2015

(54) TEST AUTOMATION TOOL FOR DOMAIN REGISTRATION SYSTEMS

(71) Applicant: Verisign, Inc., Reston, VA (US)

(72) Inventors: Omkarnath R. Chavvakula, Ashburn, VA (US); Rick Vankeuren, Leesburg, VA (US); Vijay Simha Atmavilas, South Riding, VA (US); Chandra S. Kandimalla, Ashburn, VA (US)

(73) Assignee: Verisign, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,350

(22) Filed: Sep. 30, 2013

(65) Prior Publication Data

US 2014/0052747 A1 Feb. 20, 2014

Related U.S. Application Data

(63) Continuation of application No. 12/942,600, filed on Nov. 9, 2010, now Pat. No. 8,549,479.

(51) Int. Cl.
*G06F 9/44* (2006.01)
*G06F 17/30* (2006.01)
(Continued)

(52) U.S. Cl.
CPC ...... *G06F 17/30312* (2013.01); *H04L 12/2697* (2013.01); *H04L 29/12066* (2013.01);
(Continued)

(58) Field of Classification Search
USPC ............................ 717/124–129; 707/705, 713
IPC .................. G06F 17/30011,17/30283, 11/3668, G06F 11/3672, 11/3684, 11/3692
See application file for complete search history.

(56) References Cited

U.S. PATENT DOCUMENTS 6,550,057 B1 4/2003 Bowman-Amuah
6,934,934 B1 * 8/2005 Osborne et al. ............... 717/126
(Continued)

FOREIGN PATENT DOCUMENTS

WO 2009155453 A1 12/2009

OTHER PUBLICATIONS

Storey et al, "Database Design with Common Sense Business Reasoning and Learning", ACM Transactions on Database Systems, vol. 22, No. 4, pp. 471-512, 1997.*
(Continued)

*Primary Examiner* — Anil Khatri
(74) *Attorney, Agent, or Firm* — MH2 Technology Law Group, LLP

(57) ABSTRACT

The present subject matter is directed to systems and methods for automating the testing of multi-function systems, such as naming registration systems and the like. A method of testing a registry, and the like, may include providing a command phrase including an add command and at least one function that includes an artificial attribute for a domain added by the add command. The command phrase may specify an operation, a protocol, and an object. The operation may include at least one of add, delete, or update domain. The protocol may include at least one of RRP and EPP. One or more parameters associated with the command phrase may be provided and may include an expected response code and/or a variable. One or more additional parameters that are associated with the command phrase may be determined and a database may be accessed to provide the one or more additional parameters. The command phrase, the one or more additional parameters, and/or the one or more additional parameters may be translated into an XML command and the XML command transmitted to the registry, or the like. A response from the registry may be evaluated to determine potential problems with database.

28 Claims, 4 Drawing Sheets

(51) Int. Cl.
*H04L 12/26* (2006.01)
*H04L 29/12* (2006.01)

(52) U.S. Cl.
CPC .......... *H04L29/12632* (2013.01); *H04L 43/50* (2013.01); *H04L 61/1511* (2013.01); *H04L 61/302* (2013.01)

(56) References Cited

U.S. PATENT DOCUMENTS

| | | | |
|---|---|---|---|
| 7,000,224 B1* | 2/2006 | Osborne et al. | 717/125 |
| 7,010,782 B2* | 3/2006 | Narayan et al. | 717/124 |
| 7,039,697 B2 | 5/2006 | Bayles | |
| 7,062,753 B1 | 6/2006 | Ward et al. | |
| 7,096,459 B2* | 8/2006 | Keller et al. | 717/124 |
| 7,188,138 B1 | 3/2007 | Schneider | |
| 7,203,928 B2 | 4/2007 | Mandava et al. | |
| 7,231,636 B1 | 6/2007 | Evans | |
| 7,299,452 B1* | 11/2007 | Zhang et al. | 717/124 |
| 7,409,763 B2 | 8/2008 | Pratt | |
| 7,500,225 B2* | 3/2009 | Khan et al. | 717/124 |
| 7,565,402 B2 | 7/2009 | Schneider | |
| 7,644,395 B1 | 1/2010 | Frey et al. | |
| 7,650,592 B2 | 1/2010 | Eckels et al. | |
| 7,698,425 B2 | 4/2010 | Thayer et al. | |
| 7,707,197 B2* | 4/2010 | Kaasten et al. | 707/705 |
| 7,707,557 B1 | 4/2010 | Nikolov | |
| 7,716,158 B2* | 5/2010 | McConnell | 707/713 |
| 7,747,746 B2 | 6/2010 | Thayer et al. | |
| 7,752,260 B2 | 7/2010 | King et al. | |
| 7,779,390 B1 | 8/2010 | Allavarpu et al. | |
| 7,849,448 B2* | 12/2010 | Yunus et al. | 717/126 |
| 7,904,898 B2 | 3/2011 | King et al. | |
| 7,917,497 B2 | 3/2011 | Harrison et al. | |
| 7,966,605 B1 | 6/2011 | Di Fabbrizio et al. | |
| 7,971,090 B2* | 6/2011 | Nan et al. | 717/124 |
| 8,005,970 B2 | 8/2011 | Thayer et al. | |
| 8,037,168 B2 | 10/2011 | Schneider | |
| 8,041,697 B2 | 10/2011 | Rayner et al. | |
| 8,060,864 B1* | 11/2011 | Michelsen | 717/126 |
| 8,078,924 B2* | 12/2011 | Jibbe | 714/724 |
| 8,122,006 B2* | 2/2012 | de Castro Alves et al. | 707/713 |
| 8,219,533 B2 | 7/2012 | Bennett | |
| 8,224,994 B1 | 7/2012 | Schneider | |
| 8,239,839 B2* | 8/2012 | Rossmann et al. | 717/129 |
| RE43,690 E | 9/2012 | Schneider et al. | |
| 8,365,147 B2 | 1/2013 | Grechanik et al. | |
| RE44,207 E | 5/2013 | Schneider | |
| 8,458,161 B2 | 6/2013 | Schneider | |
| 8,468,502 B2* | 6/2013 | Lui et al. | 717/127 |
| 8,495,586 B2* | 7/2013 | Zeidman | 717/128 |
| 8,612,565 B2 | 12/2013 | Schneider | |
| 8,627,295 B2* | 1/2014 | Foley et al. | 717/131 |
| 8,635,340 B1 | 1/2014 | Schneider et al. | |
| 8,645,326 B2* | 2/2014 | Weizman et al. | 707/636 |
| 8,676,774 B2* | 3/2014 | Bruno et al. | 707/705 |
| 8,706,708 B2* | 4/2014 | Reynar et al. | 707/705 |
| 2006/0230380 A1 | 10/2006 | Holmes et al. | |
| 2008/0005127 A1 | 1/2008 | Schneider | |
| 2008/0016233 A1 | 1/2008 | Schneider | |
| 2008/0046569 A1 | 2/2008 | DePue et al. | |
| 2008/0059607 A1 | 3/2008 | Schneider | |

OTHER PUBLICATIONS

Arenas et al, "An Information-Theoretic Approach to Normal Forms for Relational and XML Data", Journal of the ACM, vol. 52, No. 2, pp. 246-283, 2005.*

Deng et al,"Testing Web Database Applications ", ACM, pp. 1-10, 2004.*

Misherghi et al, "HDD: Hierarchical Delta Debugging", ACM, pp. 142-151, 2006.*

Bryant et al., "Formal Specification of Natural Language Syntax Using Two Level Grammer", ACM, 1986, pp. 527-532.

Dede et al., "Scalable and Distributed Processing of Scientific XML Data", IEEE, 2011, pp. 1-8.

Fundulaki et al., "Specifying Access Control Policies for XML Documents with Xpath", ACM, 2004, pp. 61-69.

Comai et al., "Computing Graphical Queries Over XML Data", ACM Trans. on Inf. Sys., vol. 19, No. 4, 2001, pp. 371-430.

Patrick Mevzek, "Net::DRI Readme", Mar. 24, 2010, pp. 1-6, XP002672395, http://cpansearch.perl.org/src/PMEVZEK/Net-DRI-0.96/README, retrieved from the Internet Mar. 26, 2012.

Patick Mevzek, "Net::DRI::Shell documentation", Mar. 24, 2010, pp. 1-6, XP002672396, http://search.cpan.org/~pmevzek/Net-DRI-0.96/lib/Net/DRI/Shell.pm, retrieved from the internet Mar. 26, 2012.

Hollenbeck et al., "Extensible Provisioning Protocol (EPP); rfc4930. txt", May 1, 2007, XP015052466, ISSN: 0000-0003, pp. 1-72.

* cited by examiner

TEST AUTOMATION TOOL FOR DOMAIN REGISTRATION SYSTEMS

This application claims the benefit of U.S. patent application Ser. No. 12/942,600, filed Nov. 9, 2010, which is incorporated herein by reference in its entirety.

BACKGROUND OF THE INVENTION

The present subject matter deals with tools for testing automated computer systems that perform various functions. In particular, the disclosed systems and methods provide adaptable tools for automating the testing of multi-function systems, such as, for example, naming registration systems, and the like.

Automated systems having different configurations, which may be relied upon to process similar transactions, can be difficult to test using standardized tools. For example, various different entities may operate naming registration systems, and the like, that perform similar registration, notification, billing and other functions using different protocols, channels, etc. In such circumstances, testing the operation of the various functions can present challenges in the thoroughness and amount of time required for the tests, particularly across different systems.

A description of the ways in which the Internet is intrinsically organized can be helpful in understanding some of the challenges as they relate to testing an exemplary naming registration system, and the like.

The process of establishing a web site on the internet typically begins with a registrant registering a specific domain name through a registrar. The registrant is typically an individual or organization that identifies a domain name, such as "example.com". The registrant contacts a registrar to process the name registration. The registrar sends the necessary domain name service (DNS) information to a registry. The registry receives DNS information from registrars, inserts that information into a centralized database and propagates the information on the internet so that domain names can be found by users around the world. The registry also provides information back to the registrar after this process is complete.

Thus, domain name registries and registrars work together to facilitate the registration of domain names. A domain registry typically maintains a master database of registered domain names and their linked unique internet protocol ("IP") number or address. There are an ever growing number of generic top-level domains ("gTLD") (e.g., .com, .edu, .biz, etc.) and country code top-level domains ("ccTLD") (e.g., .us, .uk, and .tv), many of which must be registered with a second-level domain (e.g., .org.uk, .me.uk, and .co.uk). Different domain registries may have different order data requirements for registering a domain name, and may also use different protocols, channels, etc.

Internet domains can be divided to groups according to their TLD suffix (e.g. .com, .net, .co.uk . . . ) with different registries responsible for each of them. A single registry may be responsible for several of these groups, such as the VeriSign registry which is responsible for domains such as .com and .net.

After a domain is registered, end-user applications may be used to find specific resources on the Internet by using the DNS resolution process. The DNS distributes the responsibility of assigning domain names and mapping those names to IP addresses by designating authoritative name servers for each domain. Authoritative name servers are assigned to be responsible for their particular domain.

DNS registries typically perform other functions related to the individual registrations such as billing, renewal notifications and processing, international domain name (IDN) processing, etc.

As mentioned above, different registries may operate different support systems using different protocols, and the like, and may also implement upgrades and service features that are different from other registries. The complexities of the these differences, and the various functions performed by the individual registries, has led to considerable difficulty in attempts to thoroughly and efficiently test registries. Likewise, the ability to perform tests across different registries has been particularly problematic. It would therefore be desirable to provide tools that are adaptable and capable of efficiently testing multi-function systems, such as domain registries and the like.

SUMMARY OF THE INVENTION

The present subject matter is directed to systems and methods for automating the testing of multi-function systems, such as naming registration systems and the like. The tool may be configured to support multiple protocols, such as, for example, extensible provisioning protocol (EPP) and/or registry registrar protocol (RRP), and channels (e.g. tcp, tcp/ssl, http, https). According to aspects of the invention, tools may also be modified to support new TLDs and/or protocol extensions/updates. As used herein, described tools may be used, for example, in the context of thin registries, in which the registry maintains only a limited amount of information on the individual domain registrants, such as the domain and name server information, and/or thick registries, in which the registry maintains a more comprehensive copy of registrant information such as technical information needed to produce zone files, and social information needed to implement operational, business, or legal practices.

According to aspects of the invention, a method of testing a registry, and the like, may include providing a command phrase specifying an operation, a protocol, and an object. The operation may include at least one of add, delete, or update domain. As used herein, "updates" should be understood as encompassing a variety of database operations, and update types, including, for example, changes to existing records, storing new elements with changes to existing elements, renewals (e.g. update to an expiration date), transfers (e.g. update a domain ownership), restore (e.g. update a status from 'xx' to 'yy', etc.). According to embodiments, the protocol may include at least one of RRP and EPP.

Embodiments may include providing one or more parameters associated with the command phrase. In embodiments, the one or more parameters may include an expected response code and/or a variable.

Embodiments may include determining that one or more additional parameters are associated with the command phrase and accessing a database to provide the one or more additional parameters. Embodiments may include translating the command phrase, the one or more additional parameters, and/or the one or more additional parameters into an XML command. The XML command may be transmitted to the registry, or the like. Embodiments may also include receiving a response from the registry based on the XML command transmitted to the registry, or the like.

In embodiments, the registry may include a TLD registry. In embodiments, the response from the registry, or the like, may be verified to evaluate a function of the registry, or the like, including at least one of an application programming interface (API) command, business logic, billing, batch processing, notification, a DNS security extension, and/or an international domain name (IDN).

According to other aspects of the invention, a method of testing a registry, and the like, may include providing a command phrase including an add command and at least one function that includes an artificial attribute for a domain added by the add command. As used herein an "artificial attribute" should be understood as including attributes associated with a domain registration, and the like, that include at least one value that is different from what would normally be assigned during an actual registration process and the like. For example, as discussed further herein, exemplary testing processes and systems may create a domain registration with an "age" representing a length of time that the new registration will be attributed to have existed previously. Such artificial attributes may be beneficial in the evaluation of functions of the registration system, and the like, that look to certain parameters as queues or flags, which would not otherwise be readily testable using a standard registration process, and the like.

Embodiments may also include translating by a computer processor the add command and the at least one other command into an XML command; transmitting the XML command to the registry; and evaluating an operation of the registry based on an expected result of the add command and the at least one other command.

In embodiments, the artificial attribute may include at least one of a simulated age for the domain, a simulated registration term, a simulated registrar subscription, and a simulated registrar account balance.

According to other aspects of the invention, a computer-readable storage medium may be encoded with instructions that, when executed by a computer, cause the computer to perform one or more automated steps as discussed herein, such as providing a command phrase specifying an operation, a protocol, and an object; providing one or more parameters associated with the command phrase; determining that one or more additional parameters are associated with the command phrase; accessing a database to provide the one or more additional parameters; translating the command phrase, the one or more additional parameters, and the one or more additional parameters into an XML command; transmitting the XML command to the registry; receiving a response from the registry; and/or determining an operation of the registry based on the response.

Further advantages of the present subject matter will become apparent to those of ordinary skill in the art upon reading and understanding the following detailed description of the preferred embodiments.

DETAILED DESCRIPTION OF THE INVENTION

The following detailed description is provided with reference to exemplary embodiments for the ease of description and understanding. Applicants' invention is not limited to the disclosed embodiments, and encompasses other variations that fall within the overall scope of description provided herein. In particular, although described in the context of a domain registrations system, the disclosed systems and methods may find applicability in various multi-purpose database systems that perform similar functions using different protocols, applications, service features, and the like.

Figure 1:
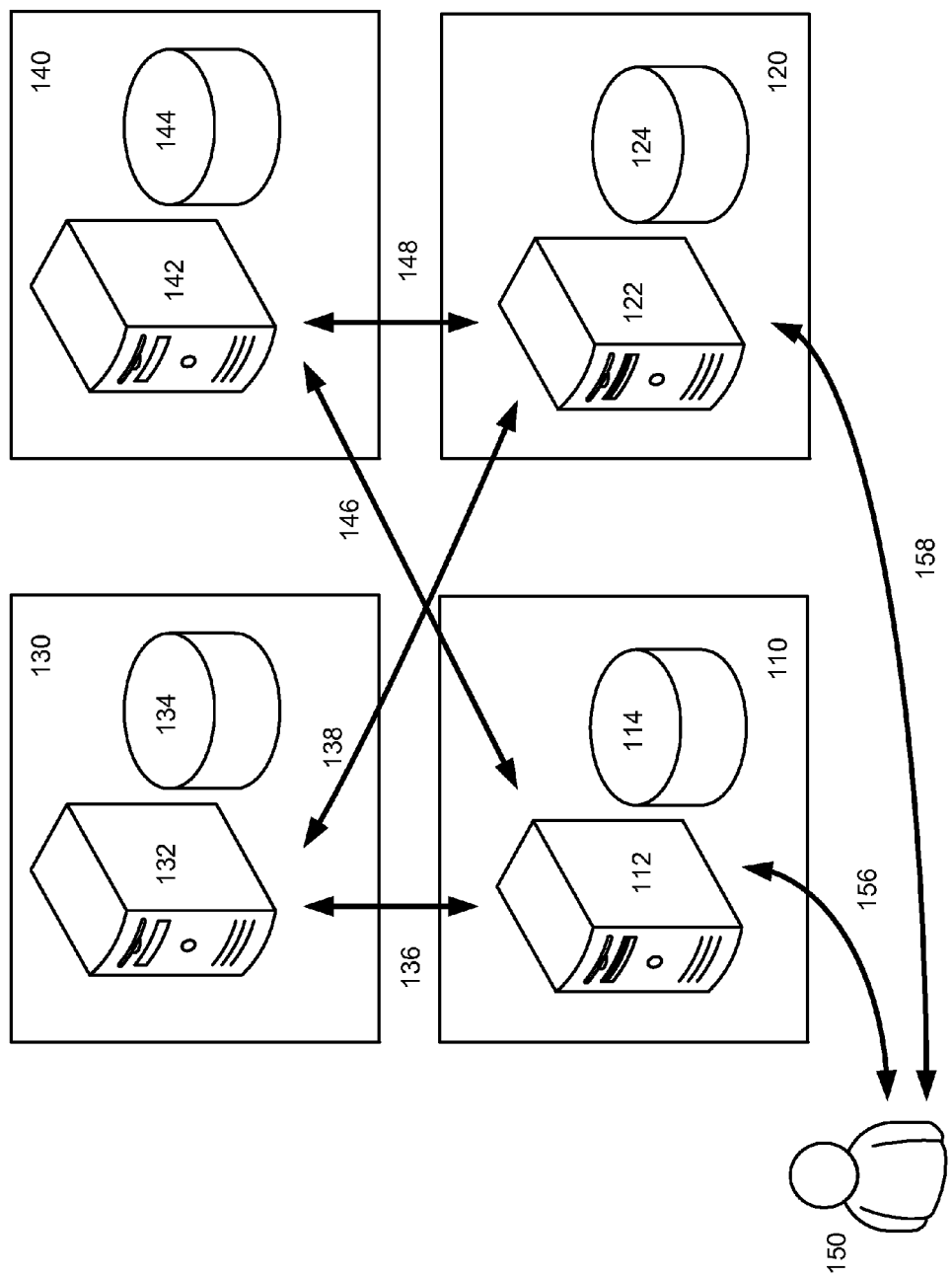
FIG. 1 depicts an exemplary system and related network of database servers in accordance with an embodiment of the present invention.

According to aspects of the invention, exemplary testing tools may be configured to accept designated natural language commands to dynamically generate test scripts, allowing testers to quickly automate tests without in-depth knowledge of the underlying system architecture or supported protocol(s). Exemplary tools may also be configured to execute designated test scripts, such as in coordination with a registry server and database, and to verify the results of the tests. In embodiments, the results of the test may be evaluated to reveal errors in processing related to multi-functions systems, such as domain registries and the like. Aspects of an environment in which such a tool may be used are depicted in FIG. 1.

As mentioned above, disclosed systems and methods may find applicability in the context of domain registry systems. As shown in FIG. 1, domain registries 110 and 120 may include registry servers 112 and 122, and databases 114 and 124, respectively. Databases 114 and 124 may include registry information such as files for registered domains including address information, registration dates, registration terms and the like. Registries 110 and 120 may be responsible for different TLD services, such as domain registry 110 supporting a gTLD (e.g. .com) and domain registry 120 supporting a ccTLD (such as .kr), and the like. Registry servers 112 and 122 may be configured with various different applications and/or service features, such as different DNS security extensions, and other applications, that may receive different commands and/or provide different services or results than the other registry server. For example, registry server 122 may be configured to apply different business logic, provide different notifications, and/or process different registration requests such as IDN registration requests, etc. Applying different business logic at a domain registry may take many forms known to those of skill in the art, such as requiring certain parameters be satisfied in order to allow registration of a domain within a particular TLD, such as .edu, etc.

Registries 110 and 120 may interact with one or more registrars 130, 140 to receive requests for registering domain names in their respective TLD, and provide information to the registrars 130, 140. Registries 110 and 120 may also typically provide the authoritative name servers for processing individual DNS resolution requests for the TLD.

Registrars 130, 140 may communicate with registries 110, 120 via various channels and protocols depending on the configuration of the registry. For example, registry 110 may be configured to process requests using EPP and communicate with registrars 103 and 140 over appropriately configured links 136, 146. Registry 120 may be configured to process requests using RRP and communicate with registrars 103 and 140 over appropriately configured links 138, 148.

According to aspects of the invention, a test tool 150 may be configured to communicate with one or more multi-function systems, such as registries 110 and 122 over links 156, and 158. In general, test tool 150 may be configured to provide commands that include similarities to requests from registrars 130, 140, but that also contain further information configured to test various operations of the registries 110 and 120. It should be noted that, although depicted as a separate entity for ease of description, test tool 150 may be embodied in various ways, such as, for example, within a registrar system, within a domain registry system, and/or as a third party application. Further details of exemplary processing methodology that may be performed by testing tool 150 are described with reference to FIG. 2.

Figure 2:
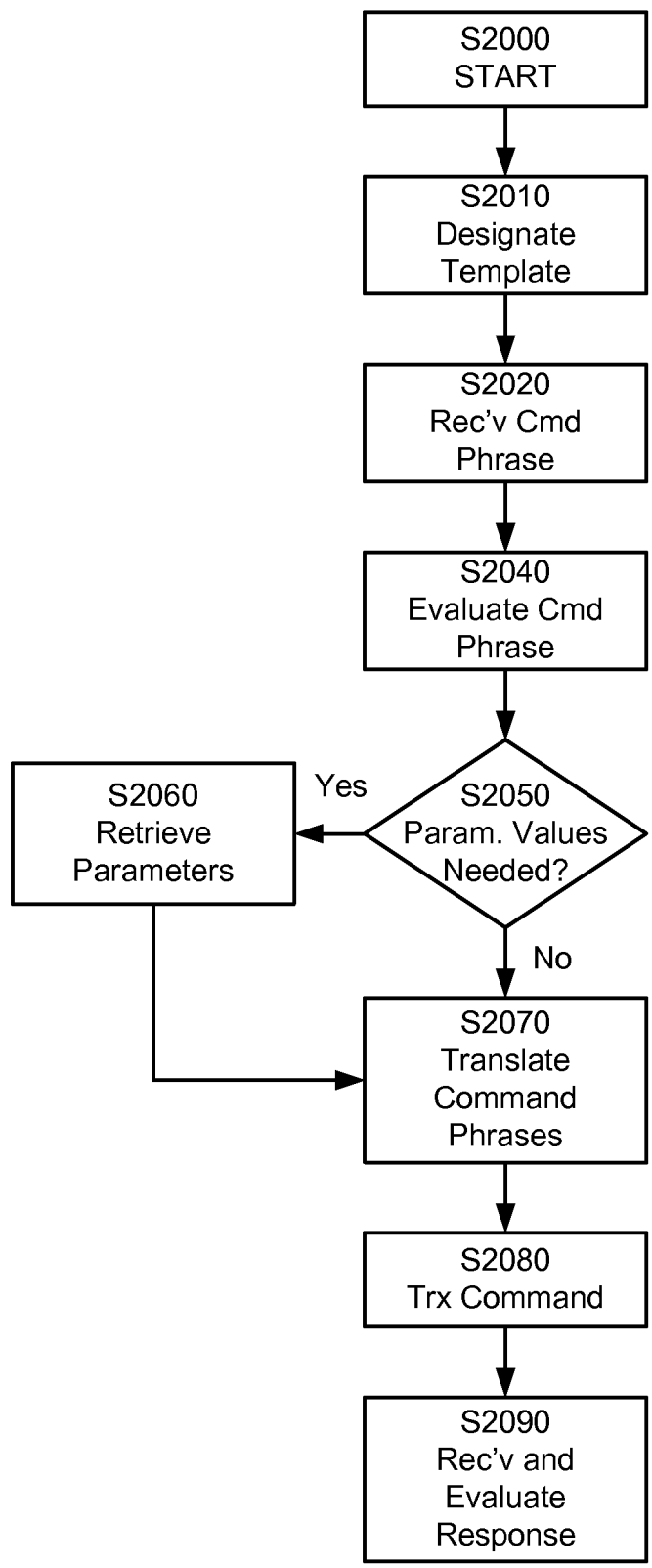
FIG. 2 depicts aspects of an exemplary method in accordance with an embodiment of the present invention.

As shown in FIG. 2, an exemplary processing methodology may begin in S2000 and may typically involve a user logging in to a computer or other device configured to process information and generate test commands based on the user's interaction with a user interface, e.g. a GUI, and automated access to various information according to the user input, as described further below. The method may continue with S2010.

In S2010, a template may optionally be automatically, or manually, selected according to, for example, a desired test. Templates may take many forms including templates created and/or modified to test certain operations, templates with specific predetermined information, such as a parameter file with various default test values, etc. The method may continue with S2020.

In S2020, the user may provide a command phrase according to predefined syntax for the test tool. In embodiments, part, or all, of the command phrase(s) may be provided in the form of a stored template that is accessed from a database and the like, or a user may modify a template as needed, or a user may otherwise generate the command phrase(s) using an interface. In embodiments, exemplary test tools may be configured to recognize a particular syntax that the templates are configured according to, and/or a user interface is configured to receive command phrases in. For example, embodiments may include recognizing command based phrases categorized in one or more of intermediate, non-command based, and functional categories. According to embodiments, exemplary systems may be configured to receive and/or recognize three-word command phrases for all categories of command based phrases. Aspects of the various types of command based phrases are discussed below.

Typically, a test case, such as a test template or original test routine generated by a user, will begin with an intermediate command based phrase, unless there is a SQL check or batch process that must be run first. According to embodiments, an intermediate command based phrase may include specifying an operation, a protocol, and an object, e.g. as: operation_protocol_object.

As described herein, a first word of the command phrase may be referred to as a keyword. Keywords for a intermediate command based phrase may include: Add, Delete, Update, Renew, Check, Info, Restore, restore-report, sync, transfer-request, transfer-query, transfer-reject, transfer-approve, transfer-cancel, which may be associated by the tool with corresponding actions from the supported protocols, e.g. RRP and APP actions, and the like. For example, the keyword "add" may be associated with the "create" EPP action, and the "add" RRP action.

In embodiments, certain keywords may not have an object associated with them and may, instead, have a uniform object listed as the third word. These keywords may typically be associated with requests to establish connections, or request a "hello" from the registry system and the like. For example, keywords Login, Logout, Pollreq, and Pollack may represent commands that do not have an associated object and may be included in an intermediate command with an object placeholder, such as "blank." For those commands the intermediate operation may be configured as, for example, operation_protocol_blank, in which case the system would ignore the third word.

Protocol words may include words that signify the protocols supported by the tool, for example, RRP and APP, and such other protocols as may be used in communication with multi-function computer database systems similar to those discussed herein.

In the context of domain registration systems, objects may include domain, host, otherwise referred to as a main server, and contacts. Thus, an example of a complete intermediate command based phrase may be similar to: add_rrp_domain.

Still referring to S2020 in FIG. 2, intermediate command based phrases may be followed by non-command based phrases. In general, these phrases may be used to provide options or values associated with expected results or input parameters for the test. As with the intermediate command based phrases, non-command based phrases may be restricted to three word phrases including a verb, and option and a value, e.g. verb_option_value. According to embodiments, non-command based phrases may begin with keywords including "expected" and "with."

Options for non-command based phrases may take many forms and may be used to establish relevant parameters for the value. That is, the option provides the context for the value. For example, in a non-command based phrase of "with_domainname_example.com", the relevant intermediate command based phrase will be executed with the domain name "example.com." Exemplary tools may be configured to recognize myriad options based on, for example, data fields, processing results, and other operations and/or information accessible by the tool and/or relevant system being tested.

In embodiments, an "expected" verb may be used when validating results of a command. In the context of domain registration systems, an exemplary testing tool may be configured to recognize a return code, or string, to validate an expected response. For example, a non-command based phrase may be structured as "expected_returncode_1000" or "expected_String1_completed#successfully". As with the intermediate command based phrase, exemplary test tools may be configured to associate, and or provide, the values of protocols supported by the tool.

According to embodiments, the "with" verb may be used with a non command request and may be followed by a variable that is to be replaced in the template. That is, the test tool may be configured to recognize that a parameter value is needed and to insert an appropriate value, such as a stored value or a generated value, into the non command request. For example, variables may be used from a parameter file as shell variables that can help, for example, in avoiding hardcoding of registrar names, TLDs for both internal and external domains and hosts, domain names, etc. In embodiments, a test tool may be configured to recognize variables such as $REGLOGONNAME1, $REGPASSWORD1, $REGLOGONNAME2, etc., $Basename, $Hostname, $Domainname, etc. In embodiments, there may be multiple variables, such as 9 variables (PARAM1 through PARAM9), in a parameter file, which can be assigned various values for use at run time. These may be used in the encoding, such as:
with_hostname_label1.$Basename.$PARAM1
which would direct that the hostname be taken from the stored value of PARAM1.

As mentioned above, exemplary test tools may be configured to recognize non-command based phrases that follow intermediate command based phrases, such as, for example:

add_rrp_domain_expected_string1_completed#successfully; or
add_epp_domain_with_registrar_test1

Still referring to S2020 in FIG. 2, functional phrases may also be included in the command based phrases. In embodiments, functional commands may include SQL and batch commands. With respect to SQL commands, exemplary tools may recognize commands for aging a domain by minutes, hours, days, months or years, setting a status for a registrar, setting or unsetting a registrar's subscription, setting and/or getting a balance for a registrar and/or getting a price for an operation. For example, a command to age a domain by 1 year may be configured as:

age_#no._(minutes,hours,days,months,years)

Or, a status of a registrar "test1" may be set to "active" by combining a "setstatus" command with an appropriate non command based phrase, configured as:

setstatus_registrar_active_with_registrar_test1

Or, a price for a domain registration operation, such as adding a domain by registrar "test1" with a command configured as:

get-price_add-domain_cc_with_registrar_test1

Various batch processes may also be included as functional phrases configured as, for example, "run_batch_batchname". In the context of domain registration systems, batches may be configured to update credit, auto renew, delete domains, etc.

Through implementation of the examples described above, the various command phrases can be included to form a "test case" during S2020. As used herein, a test case should be understood as a combination of command phrases that provide for one or more desired tests. As will be appreciated, the various command phrases that can be included in user-defined test scripts provide enormous flexibility in the testing of discreet functions in multi-function computer database systems, such as domain registries, and the standardized natural language syntax significantly eases the complexity and effort that would otherwise be required to assemble such test cases. As described further herein, multiple groups of command phrases may also be combined to provide thorough testing of desired operations, even in systems using different protocols and/or different applications. Once a user has input the desired test case in S2020, the method may proceed with S2040.

In S2040, the command phrases in the test case may be evaluated by a computer processor included in the test tool 150 to determine, for example, any additional parameters associated with the command phrase. As mentioned previously, this may include recognizing variable parameters included in, for example, a "with" verb in a non command based phrase. According to embodiments, exemplary tools may also be configure to compare a test case with a template, such as a test template selected in S2010, and/or a template that is automatically determined to be applicable based on one or more command phrases and/or parameters included in the test case, to determine whether there are additional parameters that need to be included in the test case. For example, in the case where a user has included a command phrase, such as a command phrase including a particular protocol, for which there is a corresponding template, the system may automatically determine the appropriate template in S2040. This comparison may be particularly beneficial in allowing a user access to templates that are modified and/or added on an ongoing basis, and for making it easy to re-use test cases that have already been generated, while still ensuring that they can be brought up to date with the latest templates.

By way of further example, exemplary test tools may include a script that reads the test case and creates a directory for each test. Based on the results of this reading, and comparison with a template database, the script may be configured to place the appropriate templates and an additional test run script in each directory. Thus, in each test directory there will be a copy of the templates needed to execute the test, and a test run script. The method may continue with S2050.

In S2050, the test tool may determine if any additional parameter values are needed. As discussed above, this may be accomplished for example, by recognizing variable flags and the like, and/or comparing parameters included in the test case and/or individual tests included in the test case. For example, a test run script stored in a test directory may read the test case and templates and determine whether any substitutions or additions to the test case are needed based on the comparison. Modification and/or additions may be appropriate for a wide variety of reasons depending on the nature of the test, the protocols and/or applications associated with the registry, etc. The use of templates in this context can be particularly helpful in adapting previously used test cases to updated applications, such as security applications, that may respond to different parameters than previously included in similar test cases. In such circumstances, the comparison of the test case to the template may reveal, for example, that additional parameters are needed to be included in the test case to perform a desired operation test of the relevant database system.

If it is determined in S2050 that modifications, or additions, to the parameters included in the test case are required, the method may continue with S2060. In S2060, the necessary parameters and/or changes can be acquired such as by retrieving the parameters from a database, and/or fully, or partially, generating the necessary parameters. The test case can also be updated, for example by the test run script, to include the acquired parameter(s).

If it is determined in S2050 that modifications, or additions, to the parameters included in the test case are not required, the method may continue with S2070.

In S2070, the phrases of the test case, including any additional parameters acquired in S2060, may be translated to an appropriate command language, such as XML. As discussed herein, the phrases and parameters translated in S2070 may include, for example, the command based phrases categorized in one or more of the intermediate, non-command based, and functional categories. By using the pre-determined natural language based syntax, users are able to easily create complex and powerful test cases without having to understand the underlying protocols themselves, such as XML. After the translation of the test case is complete, the method may continue with S2080.

In S2080, the translated command(s), such as an XML command, generated in S2070 may be transmitted to a multi-function database service, such as a domain registry, where the commands are processed according to the applications, rules and business logic of the database. The method may continue with S2090.

In S2090 a response is received, typically from the database server being tested, based on the command transmitted in S2080. In embodiments, the response may be one that is automatically generated by the database that processes the command, such as an acknowledgment that a domain has been registered and the like. In other embodiments, the response can be generated based on a specific query contained in the command, such as a status request command "info", and the like. In any event, the test tool, or other related system, that receives the response is configured to evaluate the response based on the command, including potentially relevant parameters included in the command. Generally speaking, the test tool applies logical rules according to the actions requested of the database and determines whether the response corresponds to a value, or the like, anticipated by the logical rule. Such rules may take myriad forms according to the functions of the database, specific codes relevant to different protocols, etc., some of which are described below. In embodiments, responses that are determined to be erroneous may be stored for example in the relevant test case directory in an error. Such records may be used to generate reports on failing systems and/or used as a basis for further evaluation and diagnostics to determine causes of the errors.

As one example of a test case in the context of domain registration systems, a test case "demo1" may be created to test the application and removal of a prohibition on a client delete function and include the following natural language based command phrases:

add_epp_domain_add_epp_host_with_v4ip1_200.175.176.1_update_epp_host_with_insstatus_
clientDeleteProhibited_info_epp_host_expected_string1_clientDeleteProhibited_info_epp_host_
update_epp_host_with_remstatus_clientDeleteProhibited_info_epp_host_expected_string1_ok_
delete_epp_host_delete_epp_domain_add_epp_host_with_hostname_$Basename.$PARAM3_
update_epp_host_with_insstatus_clientDeleteProhibited_info_epp_host_expected_string_
clientDeleteProhibited_update_epp_host_with_remstatus_clientDeleteProhibited_info_epp_
host_expected_string1_ok_delete_epp_host For clarity, this test case can be broken down into the following commands:

```
add epp domain
add epp host with v4ip1 200.175.176.1
update epp host with insstatus clientDeleteProhibited
info epp host expected string1 clientDeleteProhibited
info epp host
update epp host with remstatus clientDeleteProhibited
info epp host expected string1 ok
delete epp host
delete epp domain
add epp host with hostname $Basename.$PARAM3
update epp host with insstatus clientDeleteProhibited
info epp host expected string clientDeleteProhibited
update epp host with remstatus clientDeleteProhibited
info epp host expected string1 ok
delete epp host
```

Thus, a domain and host can be artificially added to a registration system to test the function of a particular set of operations. In this case, a domain and host are added and a status of the host is set to "clientDeleteProhibited" and then the status is removed. The registry is queried with "info" status requests and the responses evaluated based on the logical rules that apply to the update commands. This example also demonstrates an exemplary use of user-defined parameters such as "with v4ip1 200.175.176.1" and a variable parameter such as with hostname $Basename.$PARAM3.

By way of another non-limiting example, domain registries are typically configured to generate regular notifications when a domain enters the final months or weeks of a registration period. For example, a renewal notification may be sent some months before the registration term expires and further notifications may be sent when a domain enters a "pending delete" stage after the expiration of the term. Additionally, registries may automatically update a "pending delete" list based on a scan of the registered domains in their respective TLD. Therefore, according to exemplary embodiments, a test case may be assembled and transmitted to a registry that includes an artificial age of the domain, such that the domain is close to or within either of the notification periods of the registry. In embodiments, this "age" can be calibrated to the desired minute or second such that it would be expected to prompt a notification from the registry within a span of minutes or even seconds. Based on the newly created "old" domain, the testing tool may monitor for an appropriate notice and/or may query the registry for an updated pending delete list to review. In the event that an expected notification is not received, or the domain is not listed as a pending delete, the test tool may record an error related to the registry.

As will be appreciated by those of skill in the art upon understanding the concepts described herein, the test scripts, and related verifications that may be achieved by the present subject matter, may be applied in various ways to yield results in testing API commands, business logic, billing, batches, notifications, IDNs, etc. The foregoing methods may find applicability, for example, in other registry services, such as, for example, Name-exchange and WhoWas services, and may be used to test various reports and other ancillary tools that are used within multifunction database systems.

Figure 3:
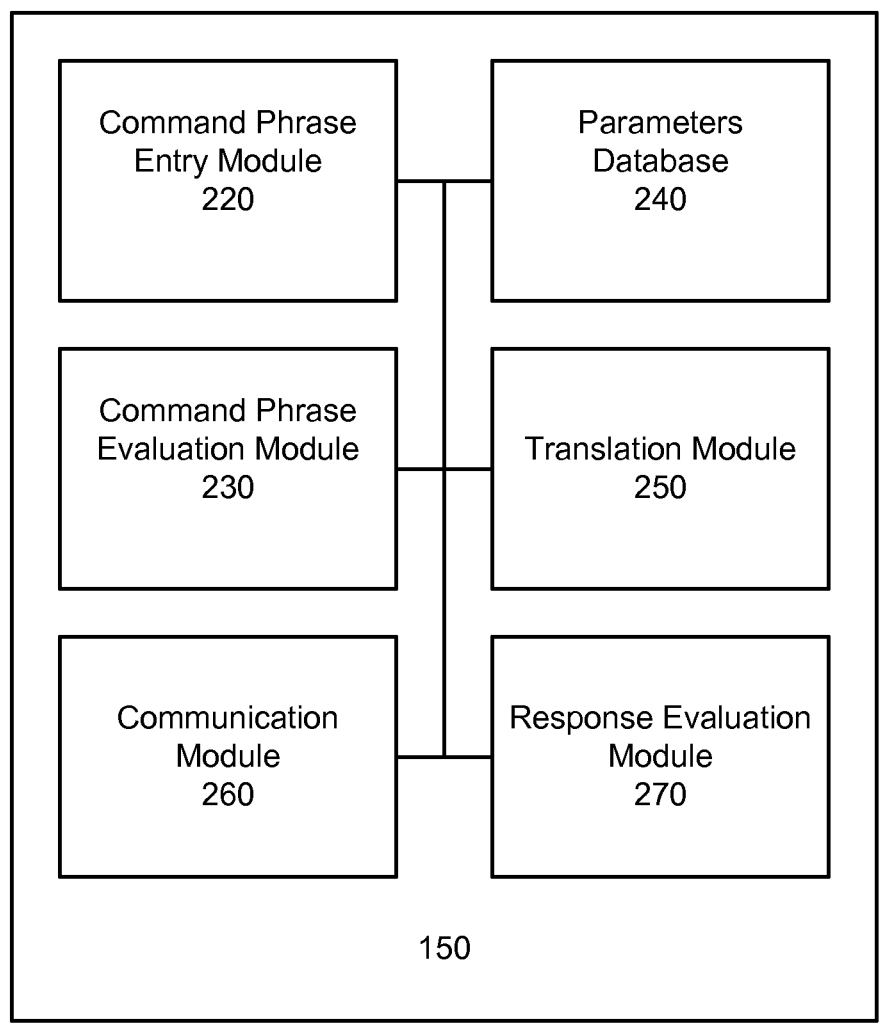
FIG. 3 depicts aspects of an exemplary computerized system in accordance with an embodiment of the present invention.

Aspects of an exemplary system for implementing methods described herein are depicted in FIG. 3. As shown in FIG. 3, an exemplary test tool, such as test tool 150 depicted in FIG. 1, may include various hardware and software modules including, for example, command phrase entry module 220, command phrase evaluation module 230, template/parameters database 240, translation module 250, communication module 260, and response evaluation module 270. These modules may interact with one or more of another in various ways known in the art such as by computer bus, wired and wireless networks, etc. Although depicted for ease of description as a unit, the various modules may be included in one or more separate units, such as execution modules running on a networked computer with access to a remote database and/or communication modules, etc.

The command phrase entry module 220 may be configured to perform various aspects of entering and configuring test cases as described herein. For example, command phrase entry module 220 may include combinations of hardware and software that present a user interface that allows a user to select template(s) and/or enter command phrases in a predetermined natural language format that can then be evaluated by command phrase evaluation module 230.

The command phrase evaluation module 230 may be implemented essentially as a computer microprocessor configured with programming that allows the command phrase evaluation module 230 to read the elements and parameters of the test case input by the user, and compare the elements and parameters to predetermined templates and/or parameter files that include the parameters necessary to process the desired tests. Appropriate templates and the like may be selected by the user, and/or the command phrase evaluation module 230 may automatically determine the appropriate template(s) based on the reading of the elements and parameters of the test case. The templates and/or parameter files may be stored locally, or remotely, in one or more parameters database(s) 240, which may be updated as desired to account for various changes such as application and business logic changes implemented by the database systems that are to be tested.

According to embodiments, command phrase evaluation module 230 may be further configured to modify the test case being evaluated to include additional and/or modified parameters as reflected in the referenced predetermined templates and/or parameter files.

The translation module 250 may also be implemented, for example, as a computer microprocessor configured with programming that allows the translation module 250 to read the elements and parameters of the test case, as modified by the command phrase evaluation module 230, and to translate, i.e. convert, the natural language based test case input by the user to a protocol suitable for communication to a database server, such as XML, and the like. The translation module 250 may also be configured to designate appropriate channels for communicating the translated command to the desired database, such as tcp, tcp/ssl, http, https, ect.

The communication module 260 may include combinations of hardware and software that provide for one or more communication channels between the test tool 150 and one or more databases to be tested, e.g. via the e.g., Internet, WAN, LAN, etc. The communication module 260 may be further configured to recognize and process responses from databases being tested, as described herein.

The response evaluation module 270 may be implemented, for example, as a computer microprocessor configured with programming that allows the evaluation module 270 to recognize responses from databases being tested and to apply logical rules based on the commands in the relevant test cases to data read from the responses. As described herein, the logical rules may be included in the commands themselves, such as through non command based phrases that modify and/or set expected parameters regarding other commands and functions included in the test case(s). Other rules may be included as, and/or derived from, portions of appropriate templates that the system recognizes as related to the commands in the test case(s). For example, various database commands, such as domain registration commands, may have known, and therefore predictable, results that need not be manually entered by the user as part of the command phrase entry process. Rules directed to such results may therefore be imported directly from a designated template to the response evaluation module 270 without the user's interaction or direction. The response evaluation module 270 may be further configured to store logs, including error logs reflecting erroneous responses from databases being tested, in a suitable database, and/or perform further processing on one or more responses to determine a cause of error in databases being tested.

Figure 4:
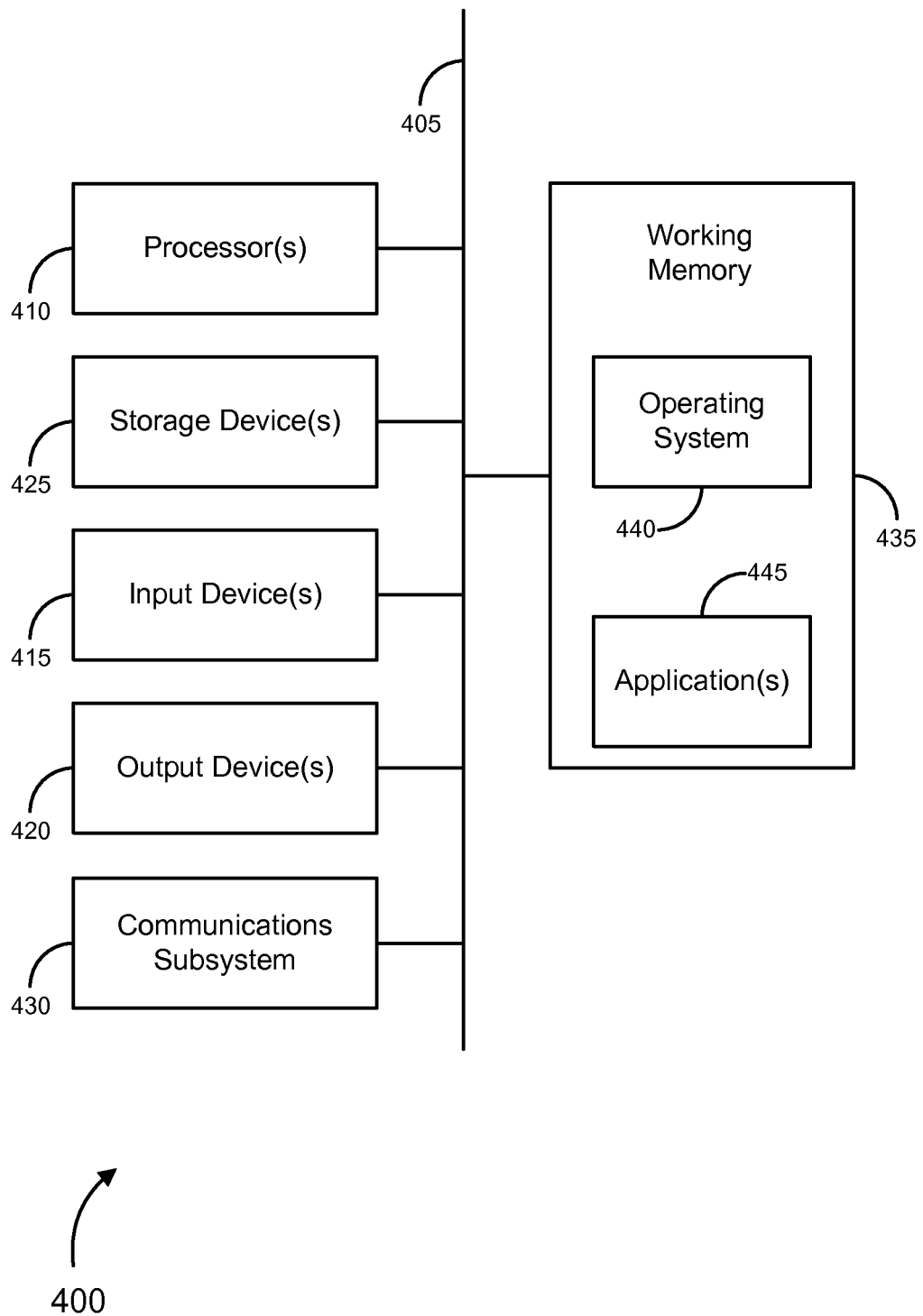
FIG. 4 depicts aspects of another exemplary computerized system in accordance with an embodiment of the present invention.

With reference to FIG. 4, a computer system 400 may be configured to perform the actions of the described modules, systems and methods, in addition to, or along with, a networked system of databases as generally shown in FIG. 1. FIG. 4 provides a schematic illustration of one embodiment of a computer system 400 that can perform the methods provided by various other embodiments, as described herein, and/or can function as the test tool, such as test tool 150 shown in FIG. 1. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

In general, the computer system 400 is shown comprising hardware elements that can be electrically coupled via a bus 405 (or may otherwise be in communication, as appropriate). The hardware elements may include without limitation one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 430 may permit data to be exchanged with a network (such as the network depicted in FIG. 1, to name one example), other computer systems, and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 425 described above. In some cases, the storage medium might be incorporated within a computer system, such as the system 400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in working memory. Such instructions may be read into a working memory 435 from another computer-readable medium, such as one or more non-transitory storage device(s) 425. Merely by way of example, execution of the sequences of instructions contained in working memory 435 may cause the processor(s) 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as working memory. Transmission media include, without limitation, coaxial cables, copper wire and fiber optics, including the wires that comprise a local bus, as well as the various components of various communication subsystems known to those of skill in the art. Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to processor(s) for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

As an additional example, according to aspects of the invention, a non-transitory computer readable storage medium may include instructions that, when executed by a computer, cause the computer to perform steps as discussed herein, such as, providing a command phrase including an add command and at least one function that includes an artificial attribute for a domain added by the add command; translating the add command and the at least one other command into an XML command; transmitting the XML command to the registry; and evaluating an operation of the registry based on an expected result of the add command and the at least one other command. Further instructions may be provided, as appropriate, to carry out other aspects of the invention as described herein.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

It is to be understood that the foregoing illustrative embodiments have been provided merely for the purpose of explanation and are in no way to be construed as limiting of the invention. Words which have been used herein are words of description and illustration, rather than words of limitation. Additionally, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed is:

1. A method of testing a database, the method comprising:
    obtaining one or more command phrases specifying a test case, wherein:
    the one or more command phrases are in a natural language based syntax; and
    the test case specifies a database operation;
    obtaining one or more parameters associated with the one or more command phrases;
    translating, using one or more processors, the one or more command phrases and the one or more parameters into an XML command;
    transmitting the XML command to the database;
    obtaining a response from the database;
    storing the response; and
    determining that the response corresponds to a predetermined anticipated response for the test case.

2. The method of claim 1, wherein the database is a registry.

3. The method of claim 2, wherein the registry comprises a thick registry.

4. The method of claim 2, wherein the registry comprises a thin registry.

5. The method claim 2, wherein the registry is a Domain Name System (DNS) registry.

6. The method of claim 5, wherein the test case comprises a test to verify DNS security extension functionality of the DNS registry.

7. The method of claim 1, wherein the test case specifies a protocol.

8. A non-transitory computer-readable storage medium bearing instructions that, when executed by a computer, cause the computer to perform the following steps:
    obtaining one or more command phrases specifying a test case, wherein:
    the one or more command phrases are in a natural language based syntax; and
    the test case specifies a database operation;
    obtaining one or more parameters associated with the one or more command phrases;
    translating the one or more command phrases and the one or more parameters into an XML command;
    transmitting the XML command to a database;
    obtaining a response from the database;
    storing the response; and
    determining that the response corresponds to a predetermined anticipated response for the test case.

9. The non-transitory computer-readable storage medium of claim 8, wherein the database is a registry.

10. The non-transitory computer-readable storage medium of claim 9, wherein the registry comprises a thick registry.

11. The non-transitory computer-readable storage medium of claim 9, wherein the registry comprises a thin registry.

12. The non-transitory computer-readable storage medium of claim 9, wherein the registry is a Domain Name System (DNS) registry.

13. The non-transitory computer-readable storage medium of claim 12, wherein the test case comprises a test to verify DNS security extension functionality of the DNS registry.

14. The non-transitory computer-readable storage medium of claim 8, wherein the test case specifies a protocol.

15. A system for testing a database comprising:
    a processor; and
    a storage medium including instructions for causing the processor to perform a method comprising:
    obtaining one or more command phrases specifying a test case, wherein:
    the one or more command phrases are in a natural language based syntax; and
    the test case specifies a database operation;
    obtaining one or more parameters associated with the one or more command phrases;
    translating the one or more command phrases and the one or more parameters into an XML command;
    transmitting the XML command to the database;
    obtaining a response from the database;
    storing the response; and
    determining that the response corresponds to a predetermined anticipated response for the test case.

16. The system of claim 15, wherein the database is a registry.

17. The system of claim 16, wherein the registry comprises a thick registry.

18. The system of claim 16, wherein the registry comprises a thin registry.

19. The system of claim 16, wherein the registry is a Domain Name System (DNS) registry.

20. The system of claim 19, wherein the test case comprises a test to verify DNS security extension functionality of the DNS registry.

21. The system of claim 15, wherein the test case specifies a protocol.

22. A method of testing a database, the method comprising:
    obtaining one or more command phrases specifying a test case, wherein:
    the one or more command phrases are in a natural language based syntax and include an artificial attribute; and
    the test case specifies a database operation;
    translating by a computer processor the one or more command phrases into an XML command;
    transmitting the XML command to the database;
    obtaining a result from the database;
    storing the result; and
    determining that the result corresponds to a predetermined expected result, wherein the predetermined expected result is correlated with the test case and the artificial attribute.

23. The method of claim 22, wherein the database is a registry.

24. The method of claim 23, wherein the registry comprises a thick registry.

25. The method of claim 23, wherein the registry comprises a thin registry.

26. The method of claim 23, wherein the registry is a Domain Name System (DNS) registry.

27. The method of claim 26, wherein the test case comprises a test to verify DNS security extension functionality of the registry.

28. The method of claim 22, wherein the test case specifies a protocol.

* * * * *